Feb. 20, 1968 A. E. FLANDERS 3,370,132

POLARIZED MAGNETIC RECORDING

Original Filed Jan. 26, 1956

ANDREW E. FLANDERS,
INVENTOR.

BY

Boniard I. Brown

ATTORNEY

United States Patent Office 3,370,132
Patented Feb. 20, 1968

3,370,132
POLARIZED MAGNETIC RECORDING

Andrew E. Flanders, 257 Hickory Ave., Pomona, Calif. 91767

Continuation of application Ser. No. 136,697, Aug. 31, 1961, which is a continuation of application Ser. No. 561,618, Jan. 26, 1956. This application Mar. 28, 1963, Ser. No. 269,844
5 Claims. (Cl. 179—100.2)

This invention relates generally to an electromagnetic transducer head and to a method of magnetic recording; more particularly, it relates to magnetic recording in terms of variations in the orientation of residually saturated particles on a record medium.

The present application is a continuation of the application of Andrew E. Flanders, Serial No. 136,697, filed on August 31, 1961, now abandoned, which was a continuation of the application of Andrew E. Flanders, Serial No. 561,618, filed on January 26, 1956, now abandoned.

Electromagnetic transducer heads for magnetic recording and reproduction conventionally operate on a principle known as intensity recording. Generally, such a head comprises a core of high permeability magnetic material having confronting pole portions defining a non-magnetic recording gap. One or more coils wound on the core produce a magnetic field in the region of the gap. Recording is accomplished by applying signal intelligence across the coil to cause the magnetic field intensity in the gap to vary in accordance with the time-variations of the signal. A record medium is subjected to this field as it passes across the gap from one pole portion to the other, and residual magnetism is impressed on the medium. The residual magnetization varies in intensity along the length of the medium in accordance with the time-variations of the signal intelligence. In the reproduction or playback of the recorded intelligence, the record medium is passed across the gap of a transducer head. The variations in residual magnetization along the length of the medium induce in the head a magnetic flux which varies in accordance with the time-variations of the recorded intelligence. A corresponding time-varying voltage is induced in coils on the head and may be amplified to reproduce the intelligence recorded.

Conventional transducer heads are characterized by certain disadvantages and shortcomings. Contact is necessary between transducer head and record medium. Mechanical friction produced by contact causes head wear and the generation of undesired heat. Variations in signal intensity result from variations in the physical spacing between the record medium and the transducer head during relative movement. It is well known in the art that variations in spacing are caused by factors which are difficult to control. When a record medium is momentarily displaced from contact with the transducer head, there is a corresponding drop in the intensity of the intelligence recorded. Another shortcoming of the conventional recording method is the lack of a sufficiently steep magnetic potential gradient at the recording gap of the recording head, with attendant limitations on the frequencies recordable and on the fidelity of reproduction. High relative velocities between head and record medium are required for accurate recording of relatively high frequency signals.

A further disadvantage of conventional recording methods is that distortion of intelligence results from nonlinearity in the remanence curve characteristic of the record medium. When the intelligence being recorded momentarily produces a magnetic field intensity at the recording gap which is more than sufficient to magnetize the record medium at its residual saturation level, no magnetization corresponding to this intensity is produced upon the medium. Additional nonlinearity between a time-varying signal voltage and the residual magnetism on a record medium results from the fact that a certain minimum or threshold intensity must be attained before there is a linear relationship. Biasing is required to correct or to alleviate the latter nonlinearity.

The present invention encompasses a method of recording and a recording head. The method of the invention involves the establishing of a unidirectional magnetic field the configuration of which is varied or distended in accordance with the intelligence submitted for recording. Two separately generated magnetic fields in orthogonal relation coact vectorially to record intelligence. A unidirectional or polarizing magnetic field is established and its configuration is varied by vectorial coaction with a signal-responsive field. Recording is effecting by varying the configuration of a recording line portion of the polarizing field during relative movement between a recording medium and the recording line. The recording line is the intersection of the record medium with a portion of the fringing flux of the polarizing field which is effectively a surface at the residual flux density of the record medium. Particles along the recording line are reoriented to conform to the configuration of the recording line at a particular instant, and recording at that instant is in terms of the extent of reorientation of particles by the instantaneous signal intensity. The recording line may be very finely defined to provide accurate resolution of recorded intelligence. The polarizing field is preferably of such intensity that substantially all magnetizable particles on the recording line are residually saturated. In a preferred form of the invention, a polarizing field is disposed in substantially perpendicular relation to a signal field in the region of a nonmagnetic gap and a magnetizable medium. The flux paths are in orthogonal relation in the region of the magnetizable meduim and there is therefore a continuous vectorial sumation of the two magnetic fields in the nonmagnetic gap. Recording on the medium is oriented in a direction substantially transverse to that of relative movement between the medium and the recording head.

It is therefore an object of the present invention to alleviate or obviate the foregoing disadvantages inherent in known recording methods and devices.

An object of the invention is the provision of a novel method of magnetic recording.

It is an object of the present invention to provide a novel electromagnetic transducer assembly.

An object of the invention is the provision of an electromagnetic transducer assembly which does not require contact between record medium and transducer head.

It is an object of the invention to provide an electromagnetic transducer wherein a magnetic field transverse to the direction of relative record medium movement varies in orientation in response to variations in intensity of a signal field to record intelligence.

An object of the present invention is the provision of a magnetic recording method and apparatus which provide a sharply defined recording line for the accurate resolution of recorded intelligence.

It is an object of the invention to provide a magnetic recording method and apparatus capable of recording intelligence with accurate resolution at slow relative velocities between a record medium and the apparatus.

An object of the present invention is the provision of an electromagnetic transducer head wherein appreciable variations in spacing between the head and a record medium produce no serious variations in the accuracy of recorded signal intensities.

An object of the invention is to provide a magnetic recording method and apparatus which eliminate the problem of intelligence distortion caused by non-linear remanence characteristics of record mediums.

Another object of the invention is the provision of a novel method of magnetic recording wherein intelligence is impressed upon a record medium by establishing a unidirectional magnetic field and varying its orientation by means of a signal field in accordance with the intelligence submitted for recording.

Other objects and features of the present invention, as well as many advantages thereof, will become apparent to those skilled in the art from a consideration of the following description, the appended claims, and the accompanying drawings, wherein:

Figures 1, 2, 3:
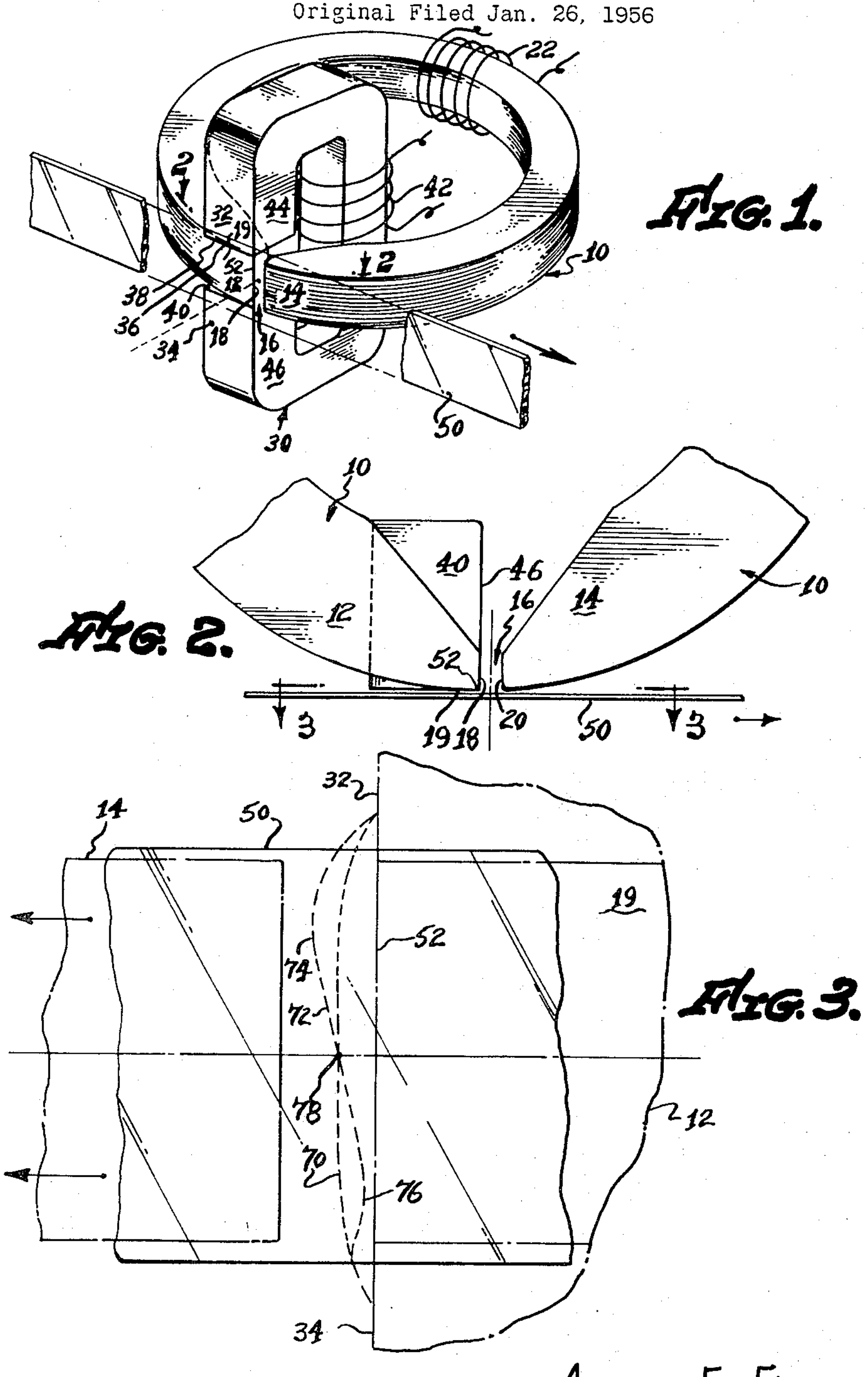
FIGURE 1 is a diagrammatic perspective view of an electromagnetic transducer head assembly according to the present invention.
FIGURE 2 is a fragmentary plan view taken at line 2—2 in FIGURE 1.
FIGURE 3 is a fragmentary sectional view taken as indicated by the arrows 3—3 in FIGURE 2, showing the disposition of pole portions and recording flux relative to a record medium.

The drawing illustrates a preferred embodiment of the present invention. A ring-shaped signal core member 10 has confronting poles 12 and 14 which define a nonmagnetic gap 16. Gap 16 may be an air gap or it may be occupied by a body of nonmagnetic material. Pole face 18 of pole 12 and pole face 20 of pole 14 are in parallel confronting relation. A curved surface 19 of pole 12 extends from gap 16, as shown. A coil or winding 22 is wound around core member 10 in conventional manner. The core member 10 is rectangular in cross-section and is of laminated construction, as indicated in FIGURE 1, layers of material of high magnetic permeability and low retentivity being separated by layers of nonmagnetic material. Core member 10 therefore presents high reluctance in the direction normal to the laminations.

A second or polarizing core member 30 is substantially C-shaped and has confronting poles 32, 34 defining a relatively wide nonmagnetic gap 36. Pole face 38 of pole 32 is in parallel confronting relation with pole face 40 of pole 34. Core member 30 is wound with coil 42 and is preferably formed of a magnetic material having high permeability, low coercivity, and a high saturation characteristic.

Core members 10 and 30 are mutually perpendicular and the pole 12 of core member 10 is disposed in the gap 36 between the poles 32 and 34 in abutting relation with their pole faces 38, 40, as shown. Although pole face 18 of pole portion 12 is shown as coplanar with polar surfaces 44 and 46, it may extend beyond these surfaces.

A magnetizable record medium or tape 50 is arranged for movement relative to poles 12 and 14 as indicated by the directional arrows in the drawing. Pole 12 is thus the leading pole or the first pole which a given portion of the record medium passes as it moves relative to the transducer head, and pole 14 is the trailing pole. As indicated in FIGURE 2, the record medium 50 does not contact any part of the transducer head. The medium carries a thin layer of magnetizable particles confronting the transducer head. It will be understood that various types of record mediums other than tape may be utilized.

In the operation of the transducer head, there is applied across coil 22 a signal voltage which is time-varying in accordance with the intelligence submitted for recordation. A correspondingly time-varying signal magnetic field is produced in the region of the nonmagnetic gap 16 between pole faces 18 and 20 of signal core member 10. Simultaneously, a relatively high unidirectional voltage is applied across coil 42 and produces a relatively intense polarizing magnetic field of constant polarity between poles 32 and 34 of core 30. If pole 12 were not disposed in gap 36, it will be understood that the polarizing field could be represented by uniformly distributed magnetic flux lines extending directly from pole face 38 to pole face 40, and by fringing flux lines extending convexedly outward between poles 32 and 34, as indicated by the line 70 in FIGURE 3. The pole 12 presents very high reluctance to the polarizing field because its laminations are normal to this field. The geometric relations of poles 12, 32 and 34 will be observed to be such that a considerable portion of the polarizing field is forced to pass through the air in the region adjacent to the pole face 18 and in the region adjacent to the polar surface 19, thereby greatly intensifying the fringing field in these regions.

The portion of the fringing field within gap 16 extends from the area of polar surface 44 adjacent to pole face 18 to the area of polar surface 46 adjacent to pole face 18. Another portion of the fringing field extends between poles 32 and 34 and extends outwardly from the pole 12 of the transducer head to the region of record member 50 and beyond. A third portion of the intense fringing field interconnects the other two portions and may be considered as having an edge 52 of pole 12 as an axis.

The magnetic intensity of the fringing polarizing field varies inversely as the square of its perpendicular distance from pole 12. All flux lines corresponding to a specific field intensity may be considered to constitute a surface or shell extending between pole portions 32 and 34. A shell or surface of a particular intensity extends arcuately between the edges of polar surfaces 44 and 46 and arcuately between pole portions 32 and 34. Such a surface includes a portion having the configuration of a quadrant of a surface of revolution having edge 52 as its axis. A cross section of the surface, taken parallel to pole faces 38 and 40, would include two straight lines joined by a curved portion having a radius of curvature about edge 52. Obviously, the sharpness of definition of such a surface is proportional to the steepness of the magnetic intensity gradient in its vicinity, and is therefore proportional to the intensity of the polarizing field.

One such surface is of particular interest in relation to the present invention. It is referred to herein as the "saturation surface" and represents the magnetic field intensity which is sufficient to effect residual saturation of the magnetizable particles on the record medium as the medium intersects the saturation surface. A very thin saturation surface and recording line are produced by a very intense polarizing field produced by operating polarizing core 30 at or near the saturation level of its iron. The saturation surface extends outwardly from pole portion 12 a distance which is governed by the intensity of the polarizing field, which is so established that the saturation surface extends beyond the plane of the record member 50. The portion of the saturation surface having the configuration of a quadrant of a surface of revolution, as hereinbefore described, intersects the tape 50 in the region adjacent to the gap 16. The line of intersection, indicated generally by the line 70 in FIGURE 3, serves as a recording line, as hereinafter described.

The record member 50 constitutes an integral part of the magnetic circuitry, because its magnetizable layer presents the path of least reluctance to the magnetic flux in its vicinity. Flux lines tend to concentrate upon it, thereby reducing the density of the polarizing flux elsewhere and affecting saturation surface configuration. This is to be considered in establishing geometrical relationships to provide the optimum resolution of and positioning of the recording line.

The fringing polarizing field including the saturation surface coacts vectorially with the signal field in the region of the record medium 50 to vary the orientation of the recording line in accordance with the signal intelligence. The angular orientation of the recording line at a particular instant is governed by the intensity of the signal field at that instant because this orientation is a vectorial resultant of the effects of the intensities of the polarizing and signal fields. The signal field varies in intensity and in polarity sense in accordance with the time-variations of the signal intelligence. The intelligence is recorded in terms of variations in the angular orientation of residually saturated magnetizable particles along the record medium.

Referring to FIGURE 3, the line 70 represents the intersection of the tape 50 with the portion of the saturation surface having the configuration of a source of revolution about edge 52, at an instant when there is no signal field between the pole portions 12 and 14. Assuming that the polarizing pole portion 32 is polarized north and that the polarizing pole portion 34 is polarized south, section 74 of the recording line is polarized north and section 76 is polarized south. When the signal intelligence at a particular instant causes pole portion 12 to have a north polarity and pole portion 14 to have south polarity, the recording line is reoriented to the configuration indicated generally by the line 72. Section 74 is attracted toward pole portion 14 and is repelled from pole portion 12, while the converse is true of section 76, as shown. When the signal intelligence reverses the polarities of signal pole portions 12 and 14, the respective orientations of sections 74 and 76 of the recording line are opposite from those shown. The degree of reorientation of recording line is proportional to the instantaneous signal field intensity. As it varies in orientation or configuration, the recording line effectively pivots about a pivot point 78. It will be readily understood that from its distortions at 74 and 76 the recording line 72 is constrained to arc toward the pole portions 32, 34 in the well-known manner characteristics of fringing flux. The portion of the line between sections 74 and 76 is generally linear and preferably this portion corresponds to the width of the recorded channel which is sensed by a reproduction head in reproducing the recorded intelligence. Outside this line portion or channel the recording line configurations bear less relation to the signal intelligence. At higher signal frequencies the recording line portions outside this channel tend to overlap and superimpose successive instantaneous record patterns.

As hereinbefore described, magnetic recording according to the present invention is effected by varying the orientation of the recording line during relative movement between the record medium and the recording head. With the tape 50 moving past the recording line and with the angular orientation of the line varying in accordance with the signal intelligence, the magnetizable particles along the recording line become residually saturated. Each particle is reoriented or rearranged to conform to the orientation of the recording line at the instantaneous location of the particle. Signal intelligence is recorded in terms of the variations along the record medium 50 in the angular orientation of magnetizable particles which are in a state of maximum remanence or retentivity. Substantially all the particles along the recording line are fully reoriented to conform to the configuration of the recording line. The flux intensity at the recording line is sufficient to saturate the magnetizable particles residually. Recording is accomplished in an orientation sense, not in the conventional intensity sense. This differs markedly from conventional recording wherein the instantaneous signal intensity is recorded in terms of the extent or degree to which particles or magnetic domains are reoriented by the instantaneous field intensity toward a parallel relation with a signal field.

From FIGURE 3 and from the geometrical relationships hereinbefore described it will be observed that before a particular increment of the tape 50 passes the recording line, it passes through the portion of the polarizing field adjacent to the signal pole portion 12. This field portion effects pre-orientation of the magnetizable particles and therefore reduces the degree of re-orientation which must be accomplished by the recording line. The saturation surface extends outward between polarizing pole portions 32 and 34 beyond the plane of the tape 50. The polarizing field portion through which the tape passes before reaching the recording line is therefore of greater intensity than the saturation surface. This high field intensity orients the magnetizable particles in the direction transverse to that of tape travel. For this purpose, the unidirectional polarizing field may preferably be a regularly fluctuating field. Obviously the frequency of such a fluctuating field must be at least several times that of the highest frequency of the signal intelligence to be recorded.

After a particular increment of the record medium 50 passes the recording line, it passes into a region of considerably lower magnetic field intensity. There being a very steep intensity gradient at the recording line, the field intensity declines sharply from the saturation level beyond that line. The recording line is therefore the last line at which the magnetizable particles are impressed with flux of sufficient intensity to impress maximum remanence or retentivity on them, and the reorientation effected by the recording line is not thereafter materially disturbed.

It will be appreciated that the accuracy of resolution of recorded intelligence and the recordable frequency range are dependent upon magnetic field intensity and upon the steepness of the intensity gradient at the recording line. A very steep intensity gradient is obtainable with the present invention because the polarizing field intensity may preferably be at the saturation level of the polarizing core itself, which level exceeds the saturation level of the magnetizable particles on the record medium. This contrasts with conventional recording wherein the maximum field intensity cannot exceed the tape saturation level without distortion of the intelligence recorded.

Recording according to the present invention is independent of the nonlinear remanence curve characteristics of record media. In this respect, there is a distinct advantage over conventional recording. Recording is effected in an orientation sense, not in an intensity sense, and the magnetizable record medium is left in a state of maximum remanence or retentivity over its entire area.

Neither contact nor accurate spacing is required between the record medium and the transducer head. The recording line is inherently of constant intensity and its basic configuration remains substantially the same despite appreciable variations in the spacing between the record medium and the head. The recording line is the intersection of the record medium with the portion of the saturation surface having the configuration of a surface of revolution about edge 52 of pole portion 12. This portion of the saturation surface extends beyond the plane of the record medium, and it is therefore apparent from the geometric relationships that the recording line will not vary substantially in configuration with appreciable variations in its distance from the head. Further, as indicated in FIGURE 2, the geometric relations are such that the magnetizable layer on the record medium provides the path of least reluctance for the signal field and the polarizing field in the region of the recording line. Signal field flux therefore tends to concentrate on the record medium 50 and to aid in the distortion of the saturation surface at the recording line, thereby tending to render the spacing between the head and the record medium uncritical and to render contact unnecessary.

In the reproduction or playback of intelligence recorded according to the present invention, a transducer head may be utilized which is polarized either in the direction of tape travel or in the transverse direction, because the reproduction head is orientation-sensing rather than intensity-sensing. The reproduction head senses the recorded intelligence in terms of variations in the field intensity induced in its pickup core, which intensity at a particular instant is a function of the mean angle of orientation of the magnetizable particles along the transverse increment of record medium being sensed at that instant. A reproduction head polarized in the direction of tape travel might be similar to the signal core 10 with as narrow a gap as is practicable.

Those versed in the art will readily appreciate that the present invention achieves the objects and realizes the advantages hereinbefore mentioned.

It will be understood that the method of the invention embraces any means by which it may be possible to vary the configuration of a unidirectional magnetic field in accordance with input intelligence to accomplish recording in the manner hereinbefore mentioned.

Although a specific embodiment of the present invention has been described and illustrated in detail, it is to be clearly understood that the same is by way of illustration and example only; it is to be understood that the invention is not limited thereto as many variations will be readily apparent to those versed in the art and the invention is to be given its broadest possible interpretation within the terms of the appended claims.

The inventor claims:

1. A transducer for magnetic recording of intelligence signals on a movable magnetic record medium spaced from said transducer, said transducer comprising:

a first, wide-gapped magnetic core means in a plane transversely perpendicular to the surface of said movable magnetic record medium, a first coil wound about said first core and adapted to generate a regularly fluctuating unidirectional polarizing field of a frequency at least several times that of the highest frequency of the intelligence signals to be recorded and having a steep intensity gradient in the direction of relative movement of said medium, to define a recording line in response to signals applied to said first coil from an external source;

a second magnetic core means disposed in a plane perpendicular to the plane of said first magnetic core means within the wide gap thereof and parallel with the direction of motion of said movable magnetic record medium, said second magnetic core means having a narrow gap parallel with and adjacent an outer edge of said first magnetic core; and a second coil wound about said second magnetic core and adapted to generate a fluctuating intelligence signal field across said narrow gap in accordance with intelligence signals applied thereto from an external source, said intelligence signal field interacting with said polarizing field on said magnetic record medium to vary said recording line in accordance with said intelligence signal.

2. In an electromagnetic transducer for recording intelligence signals on a moving magnetizable record medium adjacent said transducer, a first electromagnetic core having a first pair of wide-spaced confronting poles defining a polarizing gap and having a first coil wound thereabout, said first coil having leads for connection to an external source of fluctuating unidirectional polarizing field signals, the frequency of said fluctuating polarizing field signals being at least several times the highest frequency of intelligence signals to be recorded on said record medium; and a second electromagnetic core having a first pair of narrowly spaced confronting poles defining a recording gap, said second core being disposed perpendicularly to said first core and within said wide-spaced polarizing gap, one edge of said first core being in line with one pole face of said second core, said second core having a second coil wound thereabout, said second coil having leads for connection to an external source for varying intelligence signals, whereby a fluctuating unidirectional polarizing field having a steep intensity gradient is produced by said first core in the direction of relative movement of said record medium with respect to said transducer to define a transverse recording line on said record medium and varying intelligence signal field of lower intensity is produced by said second core which operates to distort said recording line in accordance with the variations of said intelligence signal field to produce a magnetic recording of said intelligence signals on said record medium.

3. An electromagnetic transducer head for magnetic recording upon a moving magnetizable record medium, comprising first magnetic core having a pair of confronting polarizing poles defining a nonmagnetic gap therebetween, said polarizing poles being arranged to have said magnetizable record medium pass relative thereto in a direction generally perpendicular to the plane of said first magnetic core, a first coil disposed about said first magnetic core for establishing in the region of the polarizing poles a fluctuating unidirectional polarizing magnetic field in response to fluctuating unidirectional polarizing signals applied to said first coil, the frequency of said fluctuating unidirectional polarizing signals being at least several times that of the highest frequency of the intelligence signals to be recorded, a second magnetic core having a pair of signal poles defining a nonmagnetic gap and confronting each other in a direction bearing a fixed predetermined angle with respect to the plane of said first magnetic core, one of said signal poles being disposed within said gap defined by said polarizing poles, said signal poles and said polarizing poles being so constructed and arranged that there is disposed in the region of said gap defined by said signal poles a fringing portion of said fluctuating polarizing field having a steeply declining intensity gradient in the direction of relative movement of said record medium to define a saturating transverse recording line on the record medium, and a second coil disposed about said second magnetic core for establishing in the region of said signal poles a signal magnetic field which varies in accordance with time-variations of the intelligence signals applied to said second coil, whereby said signal field coacts with said polarizing field to produce upon said record medium a record of said intelligence in terms of variations in orientation of remanent magnetism among successive incremental lengths thereof.

4. In an electromagnetic transducer for magnetic recording, a magnetically permeable polarizing core having a pair of confronting poles with pole faces defining a first nonmagnetic gap, a magnetically permeable signal core having a pair of confronting poles with pole faces of said signal core being perpendicular to the polarizing core pole faces defining a second nonmagnetic gap, a magnetizable record medium having a layer of magnetizable material and being arranged to pass in spaced noncontacting relation with said poles and the respective gaps defined by said poles, said signal core having its leading pole disposed within the gap of said polarizing core, said signal core being constructed of alternate laminations of magnetically permeable material and high reluctance material disposed in a plane substantially perpendicular to the plane of the polarizing core and between said pole faces of said polarizing core, a first coil disposed about said signal core for establishing a signal magnetic field in the region of said signal poles, said signal field varying in accordance with the intelligence being recorded, and a second coil for establishing in the region of said polarizing poles a fluctuating unidirectional polarizing field of a frequency at least several times that of the highest frequency of the intelligence signals to be recorded and having a steep intensity gradient in the direction of relative record medium movement to define a recording line on the record medium, said recording line having an intensity sufficient to impress maximum magnetic remanence upon said magnetizable record medium, said signal field interacting with said polarizing field on said record medium to produce thereon a relatively permanent recording of the intelligence in said signal field.

5. An electromagnetic transducer for recording intelligence on a magnetic medium comprising a first core and a coil wound thereabout for establishing an intense fluctuating unidirectional magnetic field of a frequency at least several times that of the highest frequency of the intelligence to be recorded, generally transverse to the direction of realtive movement of said medium and having a steep intensity gradient in the direction of relative record medium movement to define a saturating transverse recording line on the record medium parallel to said unidirectional field in response to external signals applied to said first coil; and a second core disposed within said first means and having a second coil wound thereabout for varying the orientation of a magnetic vector in accordance with time-variations in the signal intelligence applied to said second coil from an external source for recordation to vary the orientation of the field on said medium relative to said fluctuating unidirectional field of remanent magnetism on said medium along incremental lengths thereof in accordance with variations in the amplitude and polarity of said signal intelligence.

References Cited

UNITED STATES PATENTS

| | | | |
|---|---|---|---|
| 3,032,765 | 5/1962 | Begun et al. | |
| 3,087,026 | 4/1963 | Daniels | 179—100.2 |
| 3,073,912 | 1/1963 | Wooten | 179—100.2 |

FOREIGN PATENTS

| | | |
|---|---|---|
| 805,434 | 8/1936 | France. |
| 612,489 | 4/1935 | Germany. |
| 830,736 | 4/1960 | Great Britain. |

BERNARD KONICK, *Primary Examiner.*

I. L. SRAGOW, *Examiner.*

J. R. GOUDEAU, *Assistant Examiner.*